(12) United States Patent
Pantazi et al.

(10) Patent No.: US 8,711,511 B2
(45) Date of Patent: Apr. 29, 2014

(54) VIBRATION DISTURBANCE ESTIMATION AND CONTROL

(75) Inventors: Angeliki Pantazi, Zurich (CH); Nhan Xuan Bui, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/526,529

(22) Filed: Jun. 19, 2012

(65) Prior Publication Data
US 2013/0335857 A1     Dec. 19, 2013

(51) Int. Cl.
*G11B 5/55*     (2006.01)
*G11B 19/04*     (2006.01)

(52) U.S. Cl.
USPC .................. 360/75; 360/78.02; 369/53.18

(58) Field of Classification Search
CPC ... G11B 5/5582; G11B 5/5504; G11B 19/042
USPC ......... 360/75, 74, 78.02, 77.12, 97.19, 73.04, 360/72.3, 78.01, 78.14, 265.7, 77.04; 369/53.12, 53.13, 53.14, 53.15, 53.18
See application file for complete search history.

(56) References Cited

U.S. PATENT DOCUMENTS

| | | | |
|---|---|---|---|
| 6,615,110 B2 * | 9/2003 | Matsuo et al. | 700/245 |
| 7,319,570 B2 | 1/2008 | Jia et al. | |
| 7,345,841 B2 * | 3/2008 | Baugh et al. | 360/75 |
| 7,564,644 B2 * | 7/2009 | Kim et al. | 360/78.14 |
| 7,586,712 B2 * | 9/2009 | Cho et al. | 360/78.01 |
| 7,835,114 B2 * | 11/2010 | Hanya et al. | 360/265.7 |
| 2002/0145819 A1 * | 10/2002 | Kino et al. | 360/75 |
| 2009/0002869 A1 | 1/2009 | Cherubini | |
| 2009/0296269 A1 | 12/2009 | Fujita et al. | |
| 2011/0102934 A1 | 5/2011 | Bui et al. | |
| 2012/0008232 A1 | 1/2012 | Fasen | |

OTHER PUBLICATIONS

PCT International Search Report, International App. No. PCT/CA2013/050468, Sep. 24, 2013.
PCT Written Opinion, International App. No. PCT/CA2013/050468, Sep. 24, 2013.
Kartik, et al., "Track-Following High Frequency Lateral Motion of Flexible Magnetic Media With Sub-100 nm Positioning Error," IEEE Transactions on Magnetics, vol. 47, No. 7, pp. 1868-73, Jul. 2011.
White, et al., "Improved Track Following in Magnetic Disk Drives Using a Disturbance Observer," IEEE/ASME Transactions on Mechatronics, vol. 5, No. 1, Mar. 2000.
Patanzi, et al., "Track-follow Control for Tape Storage," Workshop on Dynamics and Control of Micro and Nanoscale Systems, IBM Research—Zurich, Dec. 10-11, 2009.

* cited by examiner

*Primary Examiner* — Nabil Hindi
(74) *Attorney, Agent, or Firm* — Nelson and Nelson; Daniel P. Nelson; Alexis V. Nelson

(57) ABSTRACT

A tape drive configured to accurately position a head actuator in the presence of physical disturbances is disclosed. The tape drive includes a track-follow controller to position a head actuator over data tracks on magnetic tape. The tape drive further includes a disturbance observer configured to estimate a vibration disturbance and output a compensation signal to assist the track-follow controller to accurately position the head actuator over the data tracks in the presence of vibration. When estimating the vibration disturbance, the disturbance observer takes into account vibration frequency characteristics, such as frequency characteristics derived from a vibration specification associated with the tape drive, or frequency characteristics derived from known vibration disturbances experienced by the tape drive. A corresponding method is also disclosed.

20 Claims, 9 Drawing Sheets

H∞ Filtering Formulation

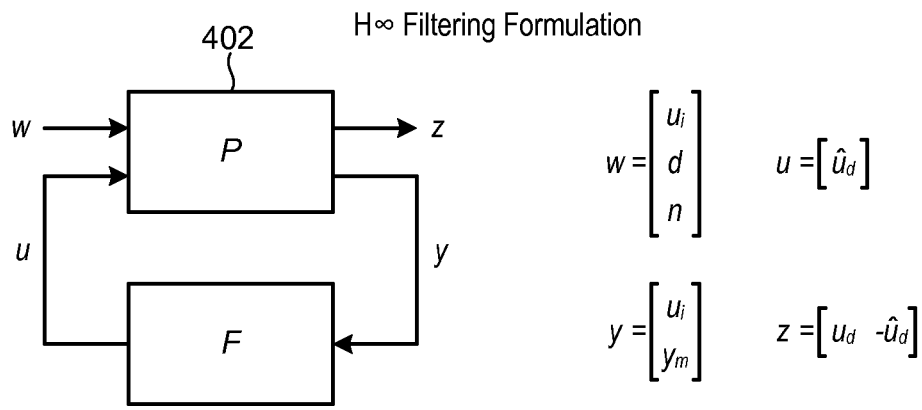

$$w = \begin{bmatrix} u_i \\ d \\ n \end{bmatrix} \quad u = \begin{bmatrix} \hat{u}_d \end{bmatrix}$$

$$y = \begin{bmatrix} u_i \\ y_m \end{bmatrix} \quad z = \begin{bmatrix} u_d & -\hat{u}_d \end{bmatrix}$$

State-Space Equations $$\hat{x} = \begin{bmatrix} \hat{x}_G \\ \hat{x}_S \\ \hat{x}_d \\ \hat{x}_n \end{bmatrix} = \begin{bmatrix} A_G & 0 & B_G C_d & 0 \\ B_S C_G & A_S & 0 & 0 \\ 0 & 0 & A_d & 0 \\ 0 & 0 & 0 & A_n \end{bmatrix} \begin{bmatrix} x_G \\ x_S \\ x_D \\ x_n \end{bmatrix} + \begin{bmatrix} B_G & B_G D_d & 0 \\ 0 & 0 & 0 \\ 0 & B_d & 0 \\ 0 & 0 & B_n \end{bmatrix} \begin{bmatrix} u_i \\ d \\ n \end{bmatrix} + \begin{bmatrix} 0 \\ 0 \\ 0 \\ 0 \end{bmatrix} \begin{bmatrix} \hat{u}_d \end{bmatrix}$$

$$z = \begin{bmatrix} 0 & 0 & C_d & 0 \end{bmatrix} \begin{bmatrix} x_G \\ x_S \\ x_D \\ x_n \end{bmatrix} + \begin{bmatrix} 0 & D_d & 0 \end{bmatrix} \begin{bmatrix} u_i \\ d \\ n \end{bmatrix} + \begin{bmatrix} -1 \end{bmatrix} \begin{bmatrix} \hat{u}_d \end{bmatrix}$$

$$y = \begin{bmatrix} u_i \\ y_m \end{bmatrix} = \begin{bmatrix} 0 & 0 & 0 & 0 \\ D_S C_G & C_S & 0 & C_n \end{bmatrix} \begin{bmatrix} x_G \\ x_S \\ x_D \\ x_n \end{bmatrix} + \begin{bmatrix} 1 & 0 & 0 \\ 0 & 0 & D_n \end{bmatrix} \begin{bmatrix} u_i \\ d \\ n \end{bmatrix} + \begin{bmatrix} 0 \\ 0 \end{bmatrix} \begin{bmatrix} \hat{u}_d \end{bmatrix}$$

Fig. 5

VIBRATION DISTURBANCE ESTIMATION AND CONTROL

BACKGROUND

1. Field of the Invention

This invention relates to apparatus and methods for estimating and controlling vibration disturbances in tape drives.

2. Background of the Invention

Reliable operation of tape drive systems requires robust performance under shock and vibration conditions. Standard vibration profiles describe specifications in terms of acceleration inputs under which tape drives must operate reliably. As the track density of tape drive systems increases, which is the norm in today's environment, ensuring reliable operation under vibration conditions becomes more challenging. This is at least partly because the higher track densities reduce the amount of error that can be tolerated during read/write operations.

In tape drives, a track-follow controller is commonly used to accurately position a head actuator on the centerline of data tracks in the presence of lateral tape motion (LTM) and external disturbances like vibrations. To support the special requirements of vibration environments along with increased track density, improved track-follow performance is needed to provide reliable tape drive operation.

Currently, there are two approaches for improving track-follow performance in vibration environments. The first approach involves switching between two track-follow controllers in response to vibration changes. A low bandwidth controller is used during low vibration conditions. A high bandwidth controller is used during high vibration conditions, but is less reliable during low vibration conditions. This approach has drawbacks in that it requires reliable detection of the onset and conclusion of vibration conditions, exhibits transient behavior when switching between the controllers, and makes it difficult to evaluate stability and performance due to the hybrid control scheme.

The second approach utilizes a disturbance observer to assist a track-follow controller in the case of vibration disturbances. The disturbance observer estimates the vibration disturbance using a position measurement of the actuator and an inversion of the actuator model. This disturbance estimate is used to compensate for the disturbance effects. This approach has drawbacks in that it requires a good and stable estimate of the inverted system dynamics and does not take into account the frequency characteristics of the disturbance. A low-pass filter determines the frequency range in which a reliable estimate is provided.

In view of the foregoing, what is needed are apparatus and methods to more effectively estimate and control vibration disturbances in tape drives.

SUMMARY

The invention has been developed in response to the present state of the art and, in particular, in response to the problems and needs in the art that have not yet been fully solved by currently available apparatus and methods. Accordingly, the invention has been developed to provide apparatus and methods to accurately position a head actuator in the presence of physical disturbances. The features and advantages of the invention will become more fully apparent from the following description and appended claims, or may be learned by practice of the invention as set forth hereinafter.

Consistent with the foregoing, a tape drive configured to accurately position a head actuator in the presence of physical disturbances is disclosed. The tape drive includes a track-follow controller to position a head actuator over data tracks on magnetic tape. The tape drive further includes a disturbance observer configured to estimate a vibration disturbance and output a compensation signal to assist the track-follow controller to accurately position the head actuator over the data tracks in the presence of vibration. When estimating the vibration disturbance, the disturbance observer takes into account vibration frequency characteristics, such as frequency characteristics derived from a vibration specification associated with the tape drive, or frequency characteristics derived from known vibration disturbances experienced by the tape drive.

A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a diagram showing an example of a H∞ filter framework for use in implementing an improved disturbance observer in accordance with the invention;

DETAILED DESCRIPTION

Figure 1:
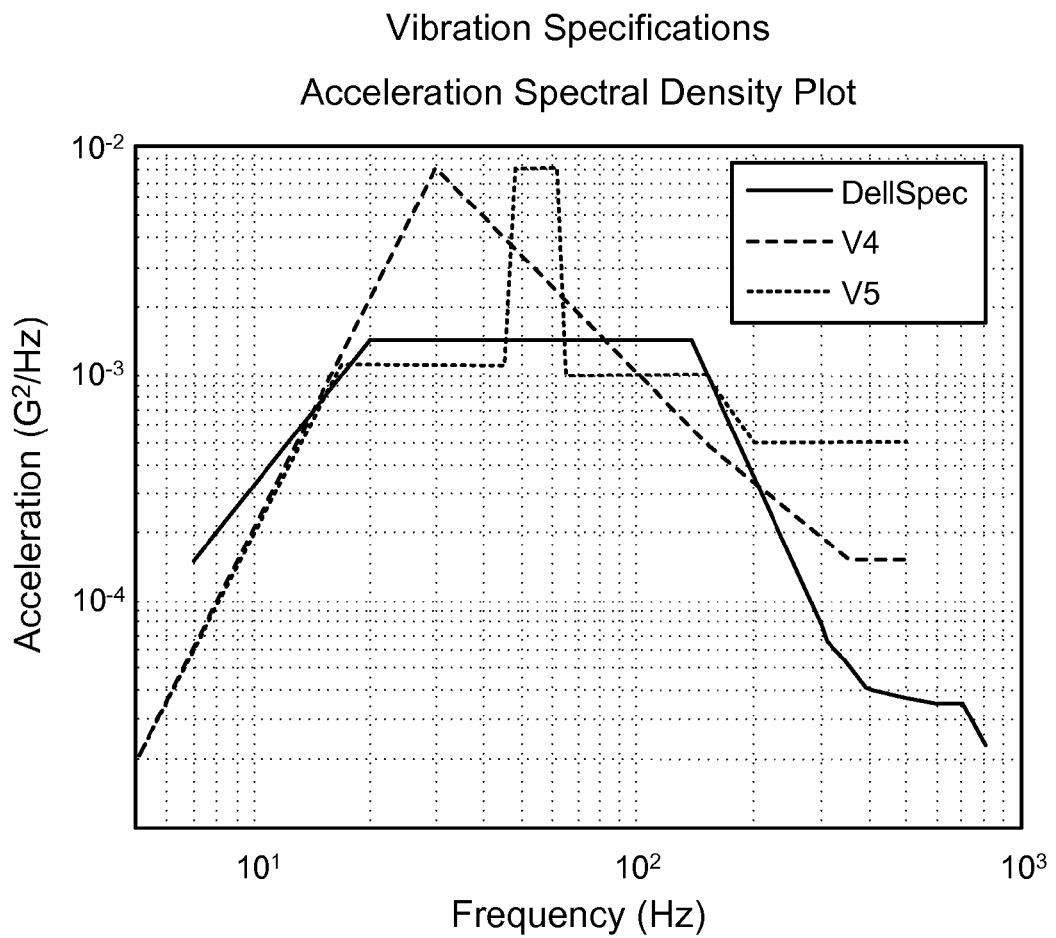
FIG. 1 is a graph showing examples of vibration specifications for tape drives.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, as previously mentioned, standard vibration profiles may be used to describe specifications in terms of acceleration inputs under which tape drives must operate reliably. FIG. 1 provides various examples of standard vibration profiles. As shown, in each exemplary vibration profile (i.e., "DellSpec," "V4," "V5"), the acceleration inputs vary as a function of vibration frequency. For example, in the "V4" vibration specification, the acceleration inputs under which a tape drive must operate reliably increase until the vibration frequency reaches about 30 Hz, after which the acceleration inputs decrease. The other vibration profiles (i.e., "DellSpec," "V5") exhibit similar characteristics. As will be explained in more detail hereafter, one of the advantages of an improved disturbance observer in accordance with the invention is its ability to take into account vibration frequency characteristics when estimating vibration disturbances, such as frequency characteristics derived from a vibration specification such as those illustrated in FIG. 1.

Figure 2:
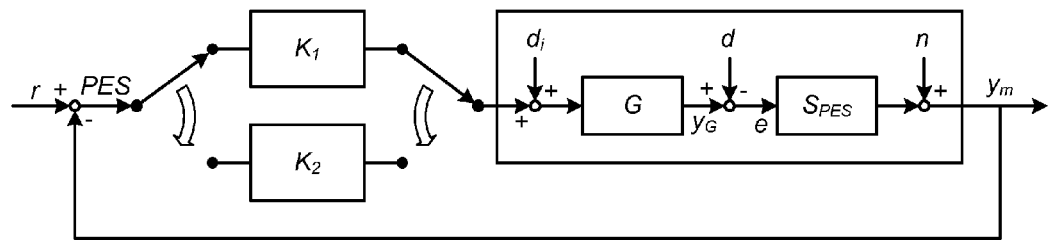
FIG. 2 is a high-level block diagram showing a first conventional approach for improving track-follow performance in tape drives.

Referring to FIG. 2, a first conventional approach for improving track-follow performance in a vibration environment is illustrated. As shown, the first approach involves switching between two track-follow controllers $K_1$, $K_2$ in response to vibration variations. A low bandwidth controller $K_1$ may be used in low vibration conditions. A high bandwidth controller $K_2$ may be used in high vibration conditions, but may be less reliable during low vibration conditions. In FIG. 2, the block G represents the head actuator—i.e., the mechanical device that is moving to follow any lateral tape motion. Block $S_{PES}$ is a servo measurement unit, which provides a measurement of the difference between the actuator position and the tape position. The input d denotes the lateral tape motion, the input $d_i$ denotes the vibration, and the input n denotes noise. The input r denotes the reference track that should be followed and the output $y_m$ denotes the measurement (i.e., location) of the actuator with respect to the tape position.

As shown, the measurement $y_m$ is subtracted from the input r to yield the position error signal (PES), which is fed to the controller $K_1$, $K_2$ that is currently in use. The PES signal varies in accordance with the amount the actuator deviates from the reference track. In response to the PES signal, the controller $K_1$, $K_2$ currently in use corrects the position of the actuator to more closely follow the reference track. As previously mentioned, this approach has drawbacks in that that it requires reliable detection of the onset and conclusion of vibration conditions (to switch between the controllers $K_1$, $K_2$), exhibits transient behavior when switching between the two controllers $K_1$, $K_2$, and makes it difficult to evaluate stability and performance due to the hybrid control scheme.

Figure 3:
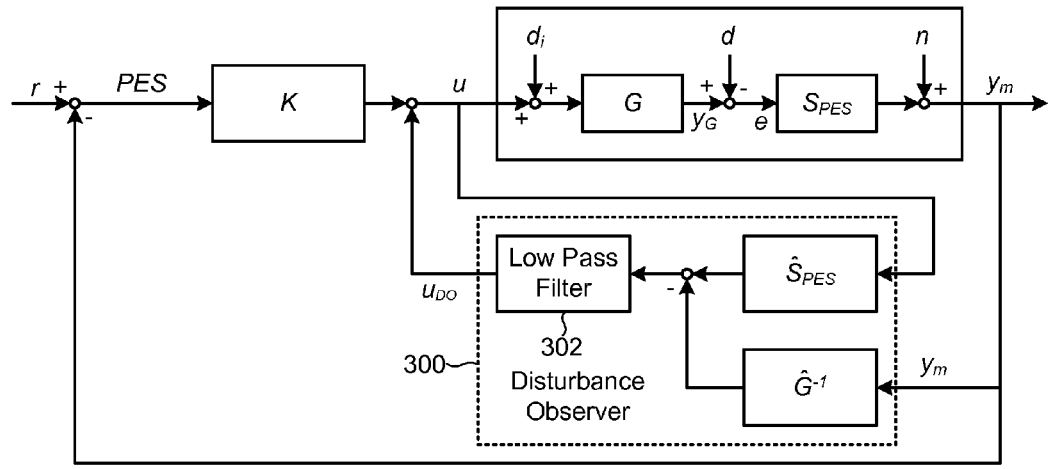
FIG. 3 is a high-level block diagram showing a second conventional approach for improving track-follow performance in tape drives.

Referring to FIG. 3, a second conventional approach for improving track-follow performance in vibration environments is illustrated. As shown, the second approach utilizes a disturbance observer 300 to assist a track-follow controller K in compensating for vibration disturbances. The disturbance observer 300 estimates the vibration disturbance using the position measurement $y_m$ as input to an estimate of the inversion (i.e., $\hat{G}^{-1}$) of the actuator model and the actuator input u as input to an estimate (i.e., $\hat{S}_{PES}$) of the servo measurement unit. The output of $\hat{G}^{-1}$ is subtracted from the output of $\hat{S}_{PES}$. The result is then passed through a low pass filter 302 to remove high frequency content. The estimated disturbance $u_{DO}$ is then subtracted from the controller output to produce the actuator input u. The main drawbacks of this approach are that it requires a good and stable estimate of the inverted system dynamics (which can be difficult to accurately estimate) and does not take into account frequency characteristics of the disturbance. The low-pass filter 302 determines the frequency range wherein the vibration disturbance estimate is provided.

Figure 4:
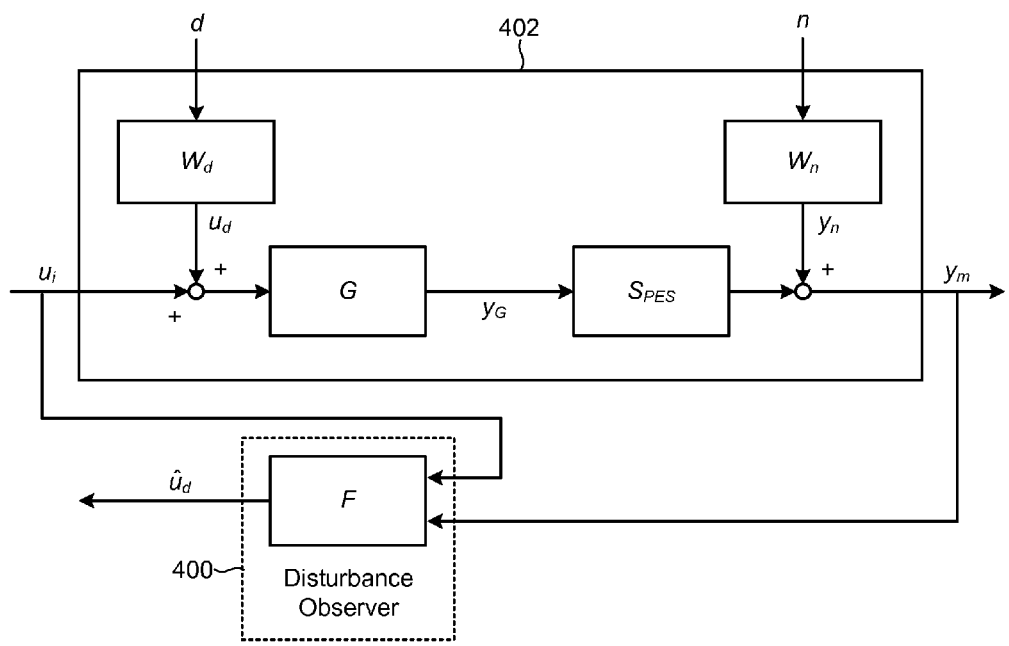
FIG. 4 is a high-level block diagram showing the design formulation of an improved disturbance observer in accordance with the invention.

Referring to FIG. 4, the design formulation of an improved disturbance observer 400 in accordance with the invention is illustrated. Such a disturbance observer 400 performs significantly better than the conventional approaches described in association with FIGS. 2 and 3. As will be explained in more detail hereafter, unlike the conventional disturbance observer 300 of FIG. 3, the improved disturbance observer 400 takes into account vibration frequency characteristics when estimating vibration disturbances, such as frequency characteristics derived from a vibration specification. In one embodiment, the estimated vibration may be added to the output of the track-follow controller K to assist with closed-loop track following, as described in association with FIG. 3. Alternatively, the estimated vibration may be used to reliably detect vibration environments in order to switch between multiple track-follow controllers $K_1$, $K_2$, as described in association with FIG. 2. Thus, the improved disturbance observer 400 may be used advantageously in different configurations to assist with track following.

In certain embodiments, an improved disturbance observer 400 in accordance with the invention includes a filter F that utilizes an H∞ filtering framework (also referred to as a "minimax" filtering framework). In the illustrated embodiment, the filter F includes two inputs (i.e., the input $u_i$ to the actuator G and the actuator position measurement $y_m$) and one output (i.e., the estimate $\hat{u}_d$ of the vibration disturbance). Unlike the conventional disturbance observer 300 illustrated in FIG. 3, the filter F may be optimized based on a vibration specification associated with a tape drive, or optimized based on actual vibration disturbances known to be experienced by a tape drive. Instead of estimating an inversion (i.e., $\hat{G}^{-1}$) of the actuator model, as occurs with the conventional disturbance observer 300, an inverted actuator model may be incorporated into the filter design. The filter F may also take into account more complicated actuator models, such as models incorporating tape-to-head skew/lateral position coupling effects. Thus, in certain embodiments, the filter F may be configured to compensate for both tape-to-head skew and lateral tape vibrations.

FIG. 5 is a high-level block diagram showing an example of a H∞ filter framework that may be utilized to design the filter F of an improved disturbance observer 400 in accordance with the invention. The H∞ filter framework may take into account the characteristics of the tape drive system 402 as well as performance requirements for the tape drive (as dictated by a vibration specification or other specification) in order to design an optimal filter F. As shown in FIG. 5, block P represents the tape drive system 402 and block F represents the filter. As further shown in FIG. 5, w represents the inputs (i.e., $u_i$, d, n) to the system P, y represents the inputs (i.e., $u_i$, $y_m$) to the filter F, and u represents the output ($\hat{u}_d$) of the filter F, also referred to herein as a compensation signal. The filtering formulation attempts to minimize the value z (i.e., the difference between the actual vibration disturbance $u_d$ and the estimated vibration disturbance $\hat{u}_d$) to design an optimal filter F. The state space equations illustrated in FIG. 5 provide one example of an H∞ filtering formulation that describes the characteristics of the tape system and the performance requirements as described by the system P in order to minimize the value of z.

The state space equations illustrated in FIG. 5 describe the dynamics of the system along with the augmented weighting filters $W_d$, $W_n$ as depicted in FIG. 4. Specifically, the state variables of the systems G, $S_{PES}$, $W_d$, $W_n$ are described by $x_G$, $x_S$, $x_d$, $x_n$, respectively. System G is represented in state-space form by the matrices $A_G$, $B_G$, $C_G$, $D_G$. Similarly, $S_{PES}$ is represented in state-space form by the matrices $A_S$, $B_S$, $C_S$, $D_S$. $W_n$ is represented in state-space form by the matrices $A_n$, $B_n$, $C_n$, $D_n$. Finally, $W_d$ is represented in state-space form by the matrices $A_d$, $B_d$, $C_d$, $D_d$.

It should be recognized that the H∞ filter framework described herein is just one example of a filter framework that may be used to design a disturbance observer 400 in accordance with the invention. In other embodiments, other filter frameworks, such as H2 filtering or Kalman filtering may be used to produce an optimal filter F for use in an improved disturbance observer 400 in accordance with the invention.

Figure 6:
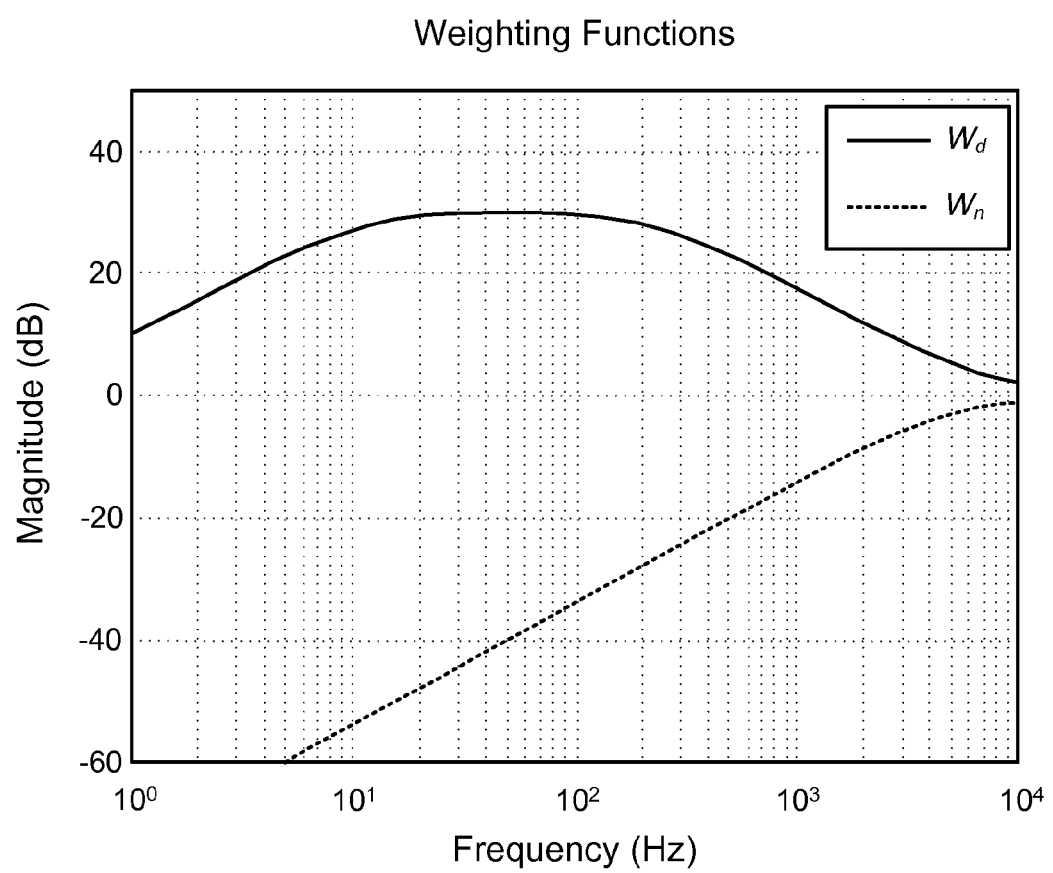
FIG. 6 is a graph showing various weighting functions for improving the operation of the disturbance observer.

Referring to FIG. 6, while also referring generally to FIG. 4, as shown, weighting functions $W_d$, $W_n$ (also referred to herein as weighting modules $W_d$, $W_n$) may be applied to the system inputs d, n to make the disturbance observer 400 more powerful at certain vibration frequencies. The weighting function $W_d$ may capture frequency characteristics of an actual vibration disturbance d and output a vibration disturbance signal $u_d$ that is weighted (i.e., amplified) in accordance with a desired weighting profile. FIG. 6 shows one example of such a weighting profile $W_d$. As shown, the weighting profile $W_d$ reaches a maximum value at approximately 30 Hz, which roughly corresponds to the peak value of the vibration profile "V4" illustrated in FIG. 1. Thus, in certain embodiments, the weighting profile $W_d$ may roughly correspond to a desired vibration specification. In other embodiments, the weighting profile $W_d$ is designed to correspond to known frequency vibrations experienced by a tape drive. A similar weighting profile $W_n$ may be provided for noise n. In the example of FIG. 6, the weighting profile $W_n$ acts as a high pass filter—i.e, eliminating noise at lower frequencies while passing noise at higher frequencies. Other weighting profiles $W_d$, $W_n$ are possible and within the scope of the invention.

Figure 7:
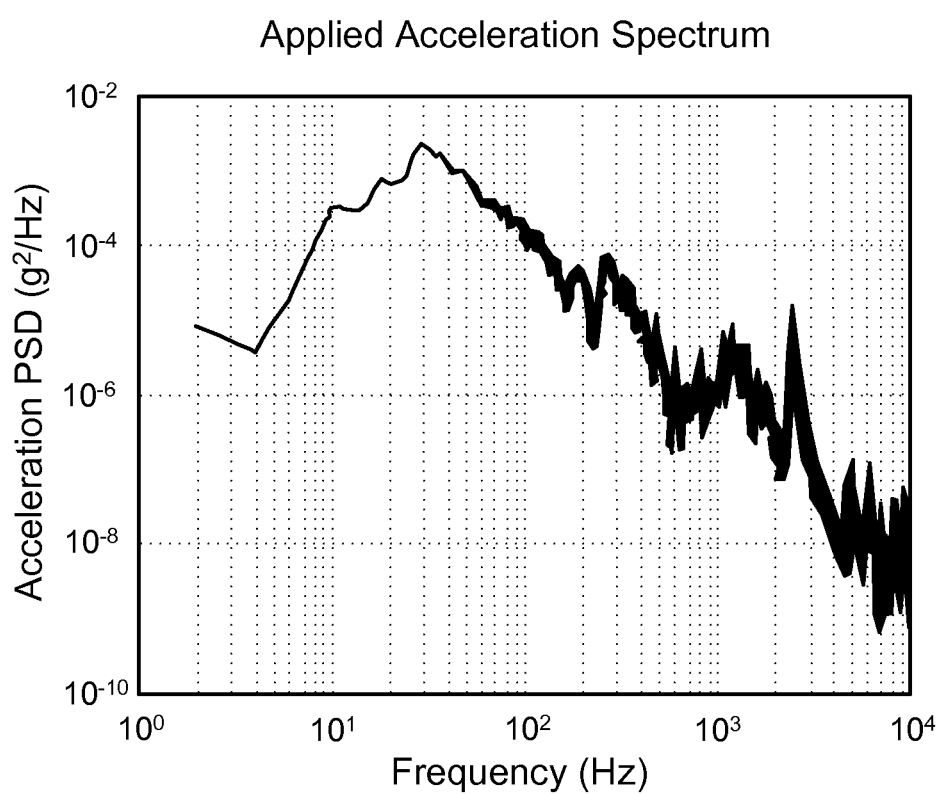
FIG. 7 is a graph showing an experimental acceleration spectrum applied to a tape drive using a disturbance observer in accordance with the invention.

Referring to FIG. 7, in order to determine the performance of an improved disturbance observer 400 in accordance with the invention, the instant inventors subjected a tape drive comprising the improved disturbance observer 400 to a vibration environment. To do so, the instant inventors mounted the tape drive to a shaker device and used an accelerometer to measure the applied vibrations. The acceleration spectrum applied to the tape drive during the experiment is illustrated in FIG. 7. As can be observed from FIG. 7, the applied acceleration spectrum roughly mimics the vibration specification "V4" illustrated in FIG. 1. The performance of the tape drive was then measured for three different scenarios (1) a standard track-follow controller without a disturbance observer; (2) a track-follow controller using a conventional disturbance observer 300 such as that illustrated in FIGS. 3; and (3) a track-follow controller using an improved disturbance observer 400 in accordance with the invention, such as that illustrated in FIG. 4.

During closed loop operation and under the applied vibrations, the standard track-follow controller without a disturbance observer generated a position error signal (PES) with a standard deviation of 604 nm; the track-follow controller using a conventional disturbance observer generated a PES signal with a standard deviation of 494 nm; and the track-follow controller using an improved disturbance observer 400 in accordance with the invention generated a PES signal with a standard deviation of 448 nm. Thus, the improved disturbance observer 400 significantly improved the performance of the tape drive in compensating for vibration disturbances.

Figure 8A:
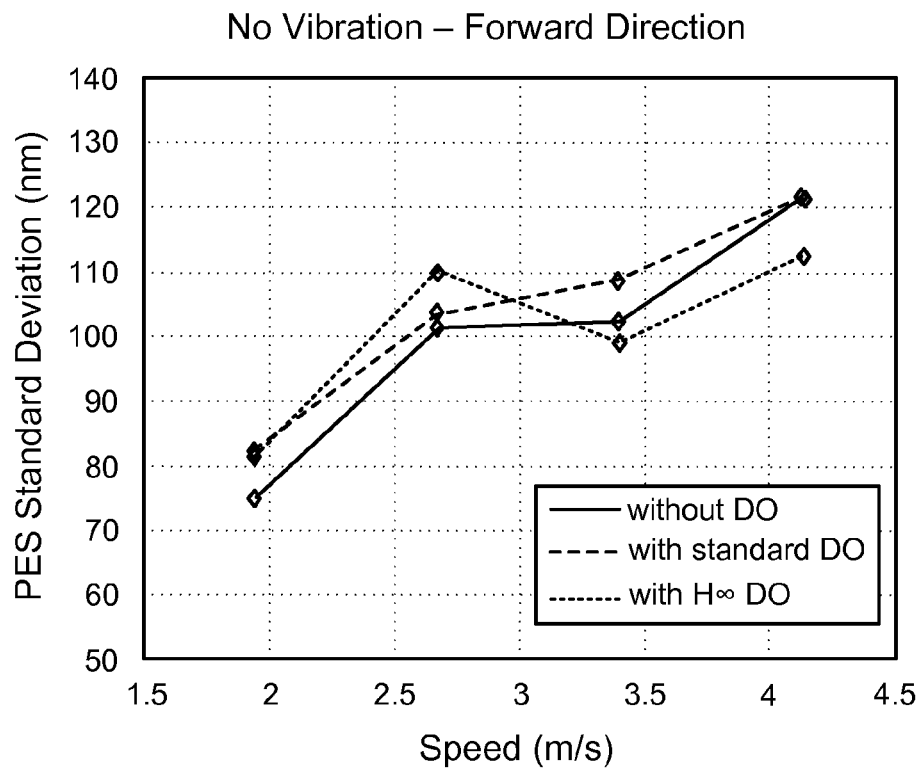
FIG. 8A shows the performance of a tape drive in three different scenarios in a non-vibration environment when operating in a forward direction.
Figure 8B:
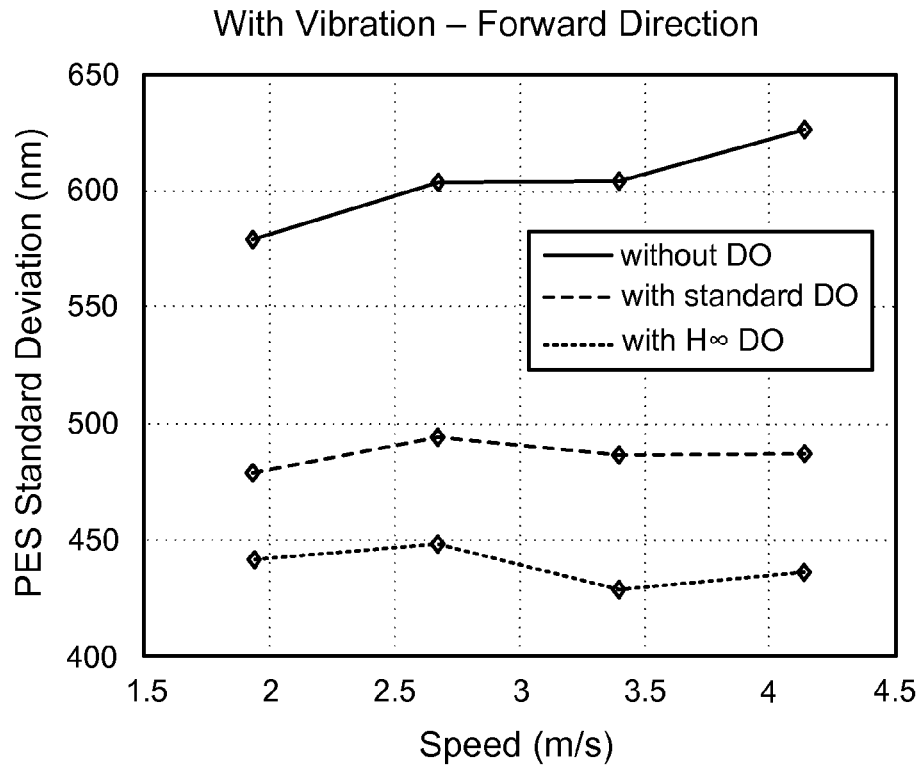
FIG. 8B shows the performance of a tape drive in three different scenarios in a vibration environment when operating in a forward direction.
Figure 9A:
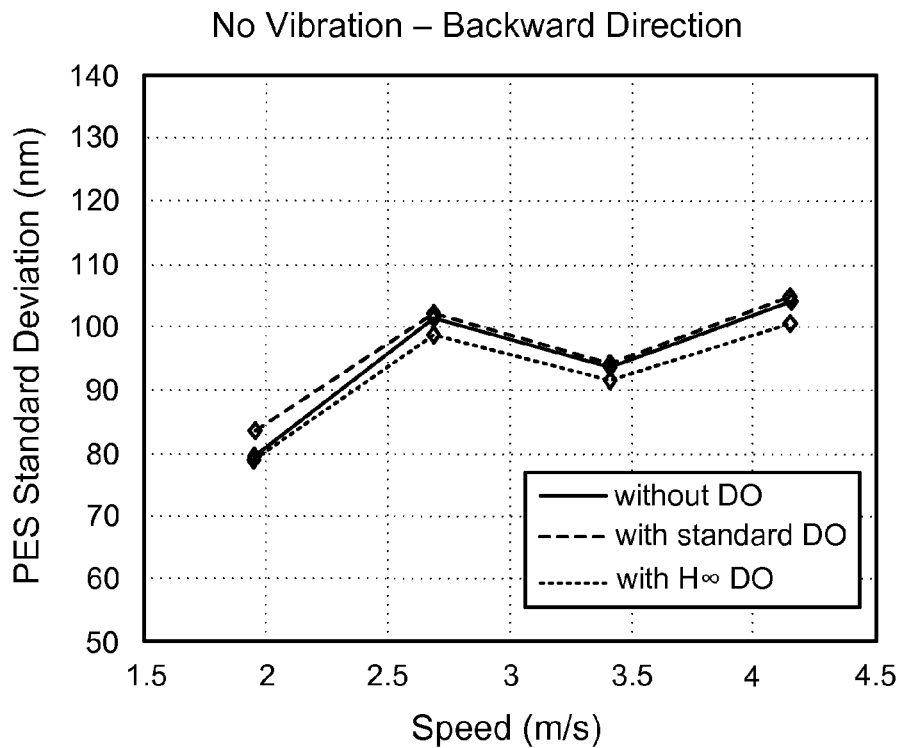
FIG. 9A shows the performance of a tape drive in three different scenarios in a non-vibration environment when operating in a backward direction.
Figure 9B:
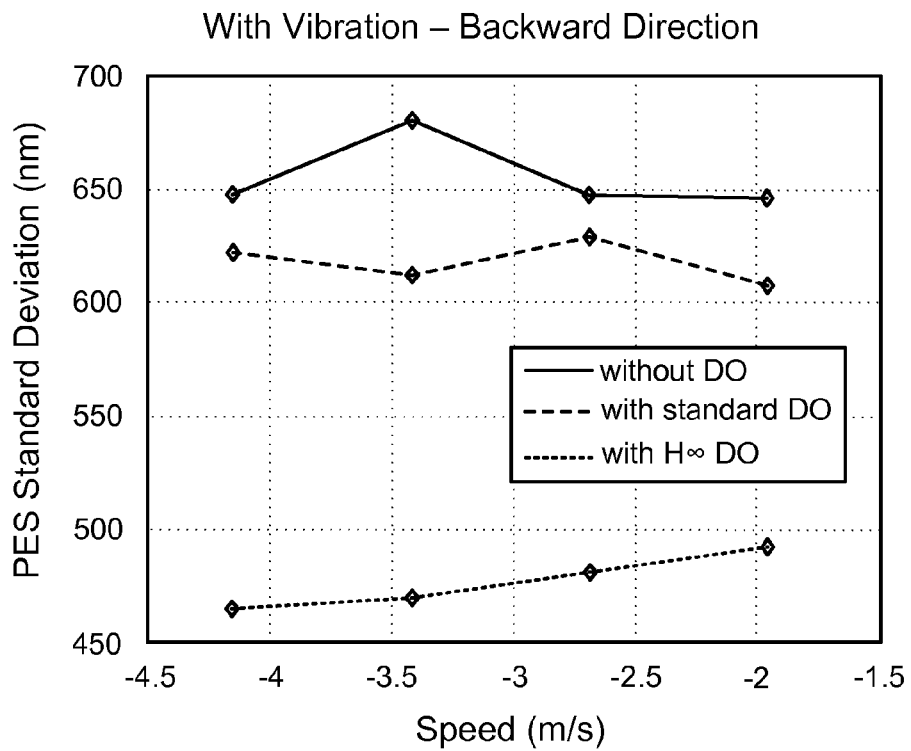
FIG. 9B shows the performance of a tape drive in three different scenarios in a vibration environment when operating in a backward direction.
Figure 10:
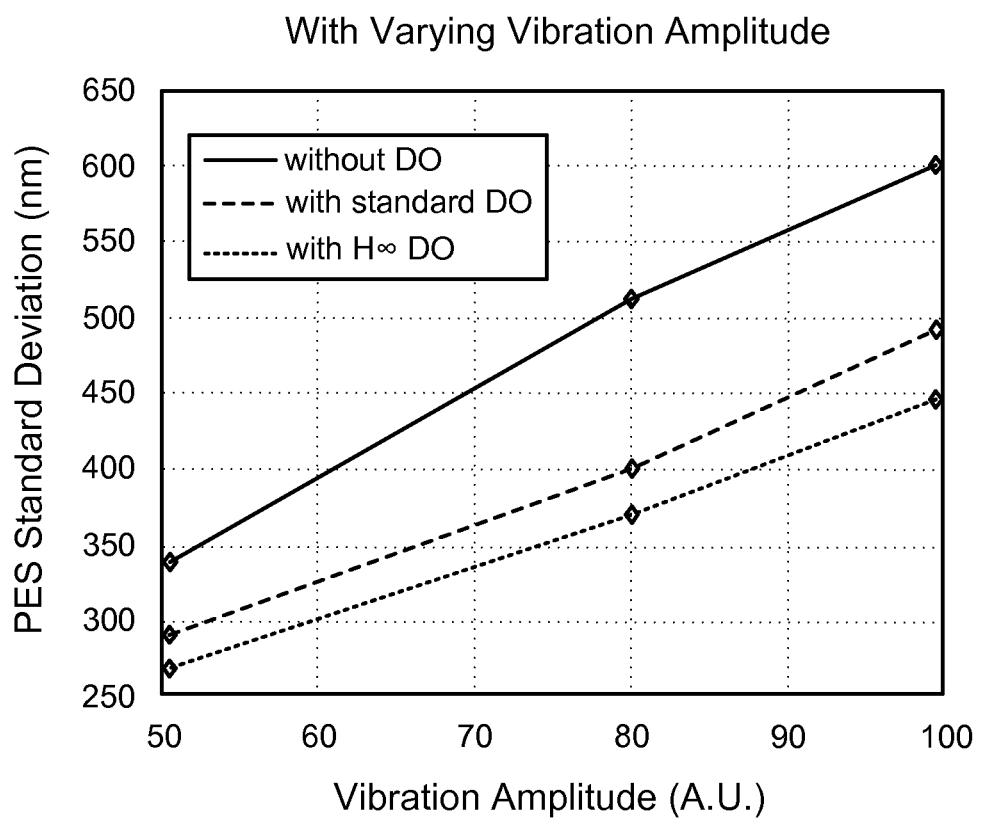
FIG. 10 shows the performance of a tape drive in three different scenarios as a function of vibration amplitude.

Referring to FIGS. 8A through 10, various tests were performed on the tape drive under vibration and non-vibration conditions for the three different scenarios listed above. FIG. 8A shows the performance of the tape drive for the three scenarios in a non-vibration environment when operating in a forward direction. FIG. 8B shows the performance of the tape drive for the three scenarios in a vibration environment when operating in a forward direction. FIG. 9A shows the performance of the tape drive for the three scenarios in a non-vibration environment when operating in a backward direction. FIG. 9B shows the performance of the tape drive for the three scenarios in a vibration environment when operating in a backward direction. FIG. 10 shows the performance of the tape drive for the three scenarios as a function of vibration amplitude.

As can be observed from FIG. 8A, each of the three scenarios exhibited similar position error signal (PES) performance when operating in the forward direction in the absence of vibrations. However, as can be observed from FIG. 8B, the PES performance of the tape drive utilizing the improved disturbance observer 400 (i.e., the disturbance observer 400 designed using the H∞ filtering framework) was significantly better than the performance of the tape drives without a disturbance observer or using a conventional disturbance observer 300.

Similarly, as can be observed from FIG. 9A, each of the three scenarios exhibited similar position error signal (PES) performance when operating in the backward direction in the absence of vibrations. However, as can be observed from FIG. 9B, the PES performance of the tape drive utilizing the improved disturbance observer 400 was significantly better than the performance of the tape drives without a disturbance observer or using a conventional disturbance observer 300.

As can be observed from FIG. 10, under varying vibration amplitudes, the PES performance of the tape drive utilizing the improved disturbance observer 400 was significantly better than the performance of the tape drives without a disturbance observer or using a conventional disturbance observer 300.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A tape drive for accurately positioning a head actuator in the presence of physical disturbances, the tape drive comprising:
    a track-follow controller to position a head actuator over data tracks on magnetic tape;
    a disturbance observer configured to estimate a vibration disturbance and output a compensation signal to assist the track-follow controller to accurately position the head actuator over the data tracks in the presence of vibration, the disturbance observer comprising a filter that incorporates an inverted actuator model into the filter design.

2. The tape drive of claim 1, wherein the disturbance observer is further configured to apply a weighting profile to an actual vibration experienced by the head actuator to produce a weighted vibration signal, the weighting profile derived from a vibration specification associated with the tape drive.

3. The tape drive of claim 1, wherein the disturbance observer is further configured to apply a weighting profile to an actual vibration experienced by the head actuator to produce a weighted vibration signal, the weighting profile derived from a known vibration disturbance experienced by the tape drive.

4. The tape drive of claim 1, wherein the filter utilizes one of an H2 filter framework and a Kalman filter framework to estimate vibration disturbance.

5. The tape drive of claim 1, wherein the filter utilizes a H∞ filter framework to estimate the vibration disturbance.

6. The tape drive of claim 5, wherein the H∞ filter framework attempts to minimize a difference between an actual vibration of the head actuator and an estimated vibration of the head actuator.

7. The tape drive of claim 1, wherein the disturbance observer receives as inputs a control input, controlling the head actuator, and a position measurement signal, indicating a position of the head actuator with respect to the magnetic tape.

8. The tape drive of claim 1, wherein the compensation signal is added to an output of the track-follow controller.

9. The tape drive of claim 1, wherein the compensation signal is configured to compensate for both tape-to-head skew and lateral vibrations within the tape drive.

10. The tape drive of claim 1, wherein the track-follow controller comprises a first controller to operate under vibration conditions and a second controller to operate under non-vibration conditions, and the compensation signal describing the estimated vibration disturbance is used to switch between the first and second controllers.

11. A method for accurately positioning a head actuator in the presence of physical disturbances, the method comprising:
    providing a track-follow controller to position a head actuator over data tracks on magnetic tape;
    estimating a vibration disturbance and outputting a compensation signal to assist the track-follow controller to accurately position the head actuator in the presence of vibration, wherein estimating the vibration disturbance comprises using a filter that incorporates an inverted actuator model into the filter design to estimate the vibration disturbance.

12. The method of claim 11, further comprising applying a weighting profile to an actual vibration experienced by the head actuator to produce a weighted vibration signal, the weighting profile derived from a vibration specification of a tape drive.

13. The method of claim 11, further comprising applying a weighting profile to an actual vibration experienced by the head actuator to produce a weighted vibration signal, the weighting profile derived from an actual vibration disturbance.

14. The method of claim 11, wherein estimating the vibration disturbance comprises utilizing one of an H2 filter framework and a Kalman filter framework to estimate the vibration disturbance.

15. The method of claim 11, wherein estimating the vibration disturbance comprises utilizing a H∞ filter framework to estimate the vibration disturbance.

16. The method of claim 15, wherein utilizing the H∞ filter framework comprises utilizing the H∞ filter framework to minimize a difference between an actual vibration of the head actuator and an estimated vibration of the head actuator.

17. The method of claim 11, wherein estimating the vibration disturbance comprises receiving as inputs a control input, controlling the head actuator, and a position measurement signal, indicating the position of the head actuator with respect to the magnetic tape.

18. The method of claim 11, further comprising adding the compensation signal to an output of the track-follow controller.

19. The method of claim 11, wherein assisting the track-follow controller comprises compensating for both tape-to-head skew and lateral vibrations.

20. The method of claim 11, wherein the track-follow controller comprises a first controller to operate under vibration conditions and a second controller to operate under non-vibration conditions, and the compensation signal describing the estimated vibration disturbance is used to switch between the first and second controllers.

* * * * *